United States Patent
Iijima et al.

(10) Patent No.: US 10,037,008 B2
(45) Date of Patent: Jul. 31, 2018

(54) ELECTRONIC TIMEPIECE

(71) Applicant: Seiko Epson Corporation, Tokyo (JP)

(72) Inventors: Yoshitaka Iijima, Omachi (JP); Yasuhiro Momose, Matsumoto (JP); Takaya Masaki, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/461,823

(22) Filed: Mar. 17, 2017

(65) Prior Publication Data

US 2017/0277129 A1     Sep. 28, 2017

(30) Foreign Application Priority Data

Mar. 28, 2016 (JP) ................ 2016-063674

(51) Int. Cl.
  *G04B 19/04* (2006.01)
  *G04B 47/06* (2006.01)
  *G01C 5/06* (2006.01)
  *G09G 5/14* (2006.01)

(52) U.S. Cl.
  CPC ........... *G04B 47/066* (2013.01); *G01C 5/06* (2013.01); *G04B 19/04* (2013.01); *G09G 5/14* (2013.01)

(58) Field of Classification Search
  CPC ........ G04B 19/06; G04B 19/08; G04B 19/04; G04B 47/066; G01C 5/06; G09G 5/14
  See application file for complete search history.

(56) References Cited

U.S. PATENT DOCUMENTS

| | | | | |
|---|---|---|---|---|
| 5,724,317 A | 3/1998 | Kubota et al. | | |
| 5,802,016 A | 9/1998 | Kubota et al. | | |
| 5,889,736 A | * 3/1999 | Fujita | ............... | G04C 10/00 368/204 |
| 6,072,752 A | * 6/2000 | Igarashi | ............... | G04C 3/14 368/187 |
| 6,349,075 B1 | * 2/2002 | Miyauchi | ............... | G04B 25/04 368/230 |
| 6,483,781 B2 | * 11/2002 | Igarashi | ............... | G04C 3/146 368/204 |
| 6,490,230 B1 | 12/2002 | Sakuyama et al. | | |

(Continued)

FOREIGN PATENT DOCUMENTS

JP     2013-092535 A     5/2013

OTHER PUBLICATIONS

Seiko Watch Corporation, Astron GPS Solar Watch Complete Use Guide, published in 2014, full document.

*Primary Examiner* — Sean Kayes
(74) *Attorney, Agent, or Firm* — Harness, Dickey & Pierce, P.L.C.

(57) ABSTRACT

An electronic timepiece includes a letter plate that has an ALT region, a BAR region, and a COM region and a first display hand that displays indication of an altitude display mode by pointing the ALT region, displays indication of a barometric display mode by pointing the BAR region, and displays indication of an azimuth display mode by pointing the COM region. In the letter plate, the ALT region, the BAR region, and the COM region are arranged in a line in this sequence. In a rotation direction of the first display hand, a distance between the ALT region and the BAR region and a distance between the BAR region and the COM region are shorter than a distance between the COM region and the ALT region.

19 Claims, 10 Drawing Sheets

(56) References Cited

U.S. PATENT DOCUMENTS

| | | | |
|---|---|---|---|
| 6,751,164 B1 | 6/2004 | Sekiguchi | |
| 8,693,290 B2 * | 4/2014 | Sato | G04C 10/02 368/205 |
| 8,717,855 B2 * | 5/2014 | Sato | G04B 19/087 368/223 |
| 8,730,769 B2 * | 5/2014 | Sato | G04B 19/065 116/298 |
| 8,848,491 B2 * | 9/2014 | Miyake | G04C 3/146 368/228 |
| 9,760,063 B2 | 9/2017 | Hasegawa | |
| 2002/0006080 A1 | 1/2002 | Shimizu et al. | |
| 2004/0016058 A1 | 1/2004 | Gardiner et al. | |
| 2007/0097795 A1 | 5/2007 | Hosobuchi et al. | |
| 2007/0183264 A1 * | 8/2007 | Raeber | B63C 11/32 368/11 |
| 2013/0033970 A1 * | 2/2013 | Miyake | G04C 3/146 368/80 |
| 2014/0286138 A1 | 9/2014 | Hasegawa | |
| 2015/0146503 A1 | 5/2015 | Nakanishi | |
| 2015/0253739 A1 | 9/2015 | Iida et al. | |
| 2015/0277387 A1 | 10/2015 | Hasegawa | |
| 2016/0209813 A1 | 7/2016 | Hasegawa | |
| 2016/0327915 A1 | 11/2016 | Katzer et al. | |
| 2017/0277129 A1 | 9/2017 | Iijima et al. | |

* cited by examiner

ELECTRONIC TIMEPIECE

BACKGROUND

1. Technical Field

The present invention relates to an electronic timepiece.

2. Related Art

There are known electronic timepieces that switch and display a battery charge amount and the fact that a mode is a reception disallowance mode by switching a position pointed by a display hand (see JP-A-2013-92535).

Incidentally, electronic timepieces are considered which have, as display modes, an altitude display mode in which an altitude is displayed, a barometric display mode in which a barometric pressure is displayed, and an azimuth display mode in which an azimuth is displayed and which switch and display a position pointed by a display hand in regard to whether the display mode is the altitude display mode, the barometric display mode, or the azimuth display mode. In this case, it is preferable to use a method of easily recognizing whether the display mode is the altitude display mode, the barometric display mode, or the azimuth display mode.

SUMMARY

An advantage of some aspects of the invention is to provide a technology for easily recognizing whether a display mode is an altitude display mode, a barometric display mode, or an azimuth display mode.

An electronic timepiece according to an aspect of the invention has an altitude display mode in which an altitude is displayed, a barometric display mode in which a barometric pressure is displayed, and an azimuth display mode in which an azimuth is displayed as display modes. The electronic timepiece includes: a member that includes first, second, and third regions; and a first display hand that displays the altitude display mode by pointing the first region, displays the barometric display mode by pointing the second region, and displays the azimuth display mode by pointing the third region. In the member, the first, second, and third regions are arranged in a line in the order of first, second, and third regions. In a rotation direction of the first display hand, a distance between the first and second regions and a distance between the second and third regions are shorter than a distance between the third and first regions.

According to the aspect of the invention, the region corresponding to the altitude display mode, the region corresponding to the barometric display mode, and the region corresponding to the azimuth display mode are disposed together in regions in the rotation direction of the first display hand. Therefore, the region corresponding to the altitude display mode, the region corresponding to the barometric display mode, and the region corresponding to the azimuth display mode are easily viewed at a time. Accordingly, it is possible to easily recognize whether the display mode pointed by the first display hand is the altitude display mode, the barometric display mode, or the azimuth display mode.

It is preferable that the electronic timepiece according to the aspect of the invention described above further includes a driving unit that rotates the first display hand; and a control unit that controls the driving unit such that the first display hand points the first region in a case in which the display mode is the altitude display mode, the first display hand points the second region in a case in which the display mode is the barometric display mode, and the first display hand points the third region in a case in which the display mode is the azimuth display mode.

According to the aspect of the invention with this configuration, the control unit can control a position pointed by the first display hand via the driving unit.

An electronic timepiece according to another aspect of the invention has an azimuth display mode in which an azimuth is displayed, an altitude display mode in which an altitude is displayed, and a barometric display mode in which a barometric pressure is displayed, as display modes. The electronic timepiece includes: a member that includes first, second, and third regions; and a first display hand that displays the azimuth display mode by pointing the first region, displays the altitude display mode by pointing the second region, and displays the barometric display mode by pointing the third region. In the member, the first, second, and third regions are arranged in a line in the order of first, second, and third regions. In a rotation direction of the first display hand, a distance between the first and second regions and a distance between the second and third regions are shorter than a distance between the third and first regions.

According to the aspect of the invention with this configuration, the region corresponding to the azimuth display mode, the region corresponding to the altitude display mode, and the region corresponding to the barometric display mode are disposed together in regions in the rotation direction of the first display hand. Therefore, the region corresponding to the azimuth display mode, the region corresponding to the altitude display mode, and the region corresponding to the barometric display mode are easily viewed at a time. Accordingly, it is possible to easily recognize whether the display mode pointed by the first display hand is the altitude display mode, the barometric display mode, or the azimuth display mode.

It is preferable that the electronic timepiece according to the aspect of the invention described above further includes a driving unit that rotates the first display hand; and a control unit that controls the driving unit such that the first display hand points the first region in a case in which the display mode is the azimuth display mode, the first display hand points the second region in a case in which the display mode is the altitude display mode, and the first display hand points the third region in a case in which the display mode is the barometric display mode.

According to the aspect of the invention with this configuration, the control unit can control a position pointed by the first display hand via the driving unit.

An electronic timepiece according to another aspect of the invention has an azimuth display mode in which an azimuth is displayed, a barometric display mode in which a barometric pressure is displayed, and an altitude display mode in which an altitude is displayed, as display modes. The electronic timepiece includes: a member that includes first, second, and third regions; and a first display hand that displays the azimuth display mode by pointing the first region, displays the barometric display mode by pointing the second region, and displays the altitude display mode by pointing the third region. In the member, the first, second, and third regions are arranged in a line in the order of first, second, and third regions. In a rotation direction of the first display hand, a distance between the first and second regions and a distance between the second and third regions are shorter than a distance between the third and first regions.

According to the aspect of the invention, the region corresponding to the azimuth display mode, the region corresponding to the barometric display mode, and the region corresponding to the altitude display mode are disposed together in regions in the rotation direction of the first display hand. Therefore, the region corresponding to the azimuth display mode, the region corresponding to the barometric display mode, and the region corresponding to the altitude display mode are easily viewed at a time. Accordingly, it is possible to easily recognize whether the display mode pointed by the first display hand is the altitude display mode, the barometric display mode, or the azimuth display mode.

It is preferable that the electronic timepiece according to the aspect of the invention described above further includes a driving unit that rotates the first display hand; and a control unit that controls the driving unit such that the first display hand points the first region in a case in which the display mode is the azimuth display mode, the first display hand points the second region in a case in which the display mode is the barometric display mode, and the first display hand points the third region in a case in which the display mode is the altitude display mode.

According to the aspect of the invention, the control unit can control a position pointed by the first display hand via the driving unit.

An electronic timepiece according to another aspect of the invention has a barometric display mode in which a barometric pressure is displayed, an altitude display mode in which an altitude is displayed, and an azimuth display mode in which an azimuth is displayed, as display modes. The electronic timepiece includes: a member that includes first, second, and third regions; and a first display hand that displays the barometric display mode by pointing the first region, displays the altitude display mode by pointing the second region, and displays the azimuth display mode by pointing the third region. In the member, the first, second, and third regions are arranged in a line in the order of first, second, and third regions. In a rotation direction of the first display hand, a distance between the first and second regions and a distance between the second and third regions are shorter than a distance between the third and first regions.

According to the aspect of the invention, the region corresponding to the barometric display mode, the region corresponding to the altitude display mode, and the region corresponding to the azimuth display mode are disposed together in regions in the rotation direction of the first display hand. Therefore, the region corresponding to the barometric display mode, the region corresponding to the altitude display mode, and the region corresponding to the azimuth display mode are easily viewed at a time. Accordingly, it is possible to easily recognize whether the display mode pointed by the first display hand is the altitude display mode, the barometric display mode, or the azimuth display mode.

It is preferable that the electronic timepiece according to the aspect of the invention described above further includes a driving unit that rotates the first display hand; and a control unit that controls the driving unit such that the first display hand points the first region in a case in which the display mode is the barometric display mode, the first display hand points the second region in a case in which the display mode is the altitude display mode, and the first display hand points the third region in a case in which the display mode is the azimuth display mode.

According to the aspect of the invention, the control unit can control a position pointed by the first display hand via the driving unit.

An electronic timepiece according to another aspect of the invention has a barometric display mode in which a barometric pressure is displayed, an azimuth display mode in which an azimuth is displayed, and an altitude display mode in which an altitude is displayed, as display modes. The electronic timepiece includes: a member that includes first, second, and third regions; and a first display hand that displays the barometric display mode by pointing the first region, displays the azimuth display mode by pointing the second region, and displays the altitude display mode by pointing the third region. In the member, the first, second, and third regions are arranged in a line in the order of first, second, and third regions. In a rotation direction of the first display hand, a distance between the first and second regions and a distance between the second and third regions are shorter than a distance between the third and first regions.

According to the aspect of the invention, the region corresponding to the barometric display mode, the region corresponding to the azimuth display mode, and the region corresponding to the altitude display mode are disposed together in regions in the rotation direction of the first display hand. Therefore, the region corresponding to the barometric display mode, the region corresponding to the azimuth display mode, and the region corresponding to the altitude display mode are easily viewed at a time. Accordingly, it is possible to easily recognize whether the display mode pointed by the first display hand is the altitude display mode, the barometric display mode, or the azimuth display mode.

It is preferable that the electronic timepiece according to the aspect of the invention described above further includes a driving unit that rotates the first display hand; and a control unit that controls the driving unit such that the first display hand points the first region in a case in which the display mode is the barometric display mode, the first display hand points the second region in a case in which the display mode is the azimuth display mode, and the first display hand points the third region in a case in which the display mode is the altitude display mode.

According to the aspect of the invention, the control unit can control a position pointed by the first display hand via the driving unit.

It is preferable that the electronic timepiece according to the aspect of the invention described above further includes a second display hand that displays an operation state of the electronic timepiece by pointing a fourth region and displays a residual quantity of a battery which is a power supply of the electronic timepiece by pointing a fifth region, and a predetermined region including the first, second, and third regions is adjacent to a specific region including the fourth and fifth regions.

When a user ascertains a state of the electronic timepiece, the user can view a position pointed by the second display hand to confirm an operation state of the electronic timepiece and the battery residual quantity, and view a position pointed by the first display hand to confirm the display mode of a current situation.

According to the aspect of the invention with this configuration, the predetermined region including the first, second, and third regions pointed by the first display hand is adjacent to the specific region including the fourth and fifth regions pointed by the second display hand. Therefore, when the user ascertains the state of the electronic timepiece, the user can view the display mode of the current situation displayed by the first display hand and the operation state or the battery residual quantity displayed by the second display hand at a time, and thus necessity of considerably moving a visual line is lowered. Accordingly, it is possible to obtain high visibility of display content of the first display hand and display content of the second display hand.

In the electronic timepiece according to the aspect of the invention described above, it is preferable that the first and second display hands rotate about a same axis.

According to the aspect of the invention with this configuration, the first and second display hands rotate about the same axis. Therefore, it is possible to achieve space saving more than in a case in which the first and second display hands rotate about different axes.

In the electronic timepiece according to the aspect of the invention described above, it is preferable that the operation state which is displayed by the second display hand includes a measurement progress state meaning that measurement corresponding to a display mode which is displayed by the first display hand is being executed, and in the fourth region, a sixth region corresponding to the measurement progress state is adjacent to the predetermined region.

According to the aspect of the invention with this configuration, the region corresponding to the measurement progress state (the sixth region pointed by the second display hand) is adjacent to the predetermined region pointed by the first display hand. Therefore, the user can view the display mode pointed by the first display hand in the predetermined region and display regarding whether the measurement corresponding to the display mode is being executed (display by the second display hand) at a time.

In the electronic timepiece according to the aspect of the invention described above, it is preferable that the second display hand operates at intervals of angles obtained by dividing 360° by 4n (where n is a natural number less than 15).

In the electronic timepiece with the pointing hand, a configuration is generally used in which the pointing hand operates at intervals of angles obtained by dividing 360° by 60. When the second display hand operates at intervals of angles obtained by dividing 360° by 4n, a travel distance of the second display hand in an one-time operation can be longer than in the case in which the second display hand operates at intervals of angles obtained by dividing 360° by 60. Accordingly, it is possible to shorten a switching time of the position pointed by the second display hand.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
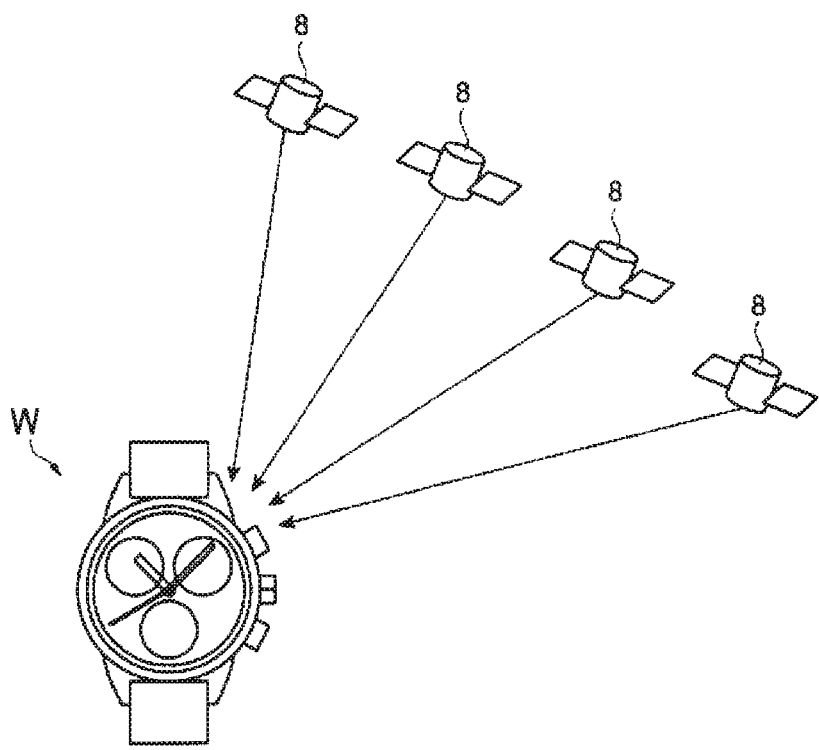
FIG. 1 is an overall diagram illustrating GPS including an electronic timepiece according to an embodiment of the invention.

Hereinafter, embodiments of the invention will be described with reference to the drawings. The dimensions and scales of the units in the drawing are appropriately different from actual dimensions and scales. The embodiments to be described below are specific preferred examples suitable for the invention. Therefore, in the embodiments, various technically preferred limitations are imposed. However, the scope of the invention is not limited to such forms unless otherwise mentioned to particularly limit the invention in the following description.

FIG. 1 is an overall view illustrating GPS including an electronic timepiece W with a sensor (hereinafter simply referred to as an "electronic timepiece") according to the embodiment. The electronic timepiece W obtains positional information and time information of a current site using radio waves which are examples of external signals.

The electronic timepiece W is a wristwatch that receives radio waves (satellite signals) from GPS satellites 8 and corrects an internal time. The electronic timepiece W displays a time or the like on an opposite surface (hereinafter referred to as a "front surface") to a surface (hereinafter referred to as a "rear surface") on a side coming into contact with an arm. The GPS satellites 8 are navigation satellites that turn around a predetermined orbit above the Earth. The GPS satellites 8 transmit radio waves (L1 waves) with 1.57542 GHz on which a navigation message is superimposed, to the ground. In the following description, radio waves with 1.57542 GHz on which a navigation message is superimposed are referred to as satellite signals. The satellite signals are circularly polarized waves of right handed polarized waves.

At present, there are about 31 GPS satellites 8 (in FIG. 1, only four satellites are illustrated). To identify which satellite signal is transmitted from which GPS satellite 8, each GPS satellite 8 superimposes a unique pattern with 1023 bits (a period of 1 ms) called a C/A code (coarse/acquisition code) on a satellite signal. Each bit is one of +1 and −1. Therefore, the C/A code is seen to be a random pattern.

An atomic clock is mounted on the GPS satellite 8. The satellite signal includes considerably accurate GPS time information measured by the atomic clock. A negligible time error of the atomic clock mounted on each GPS satellite 8 is measured by a ground control segment. The satellite signal also includes a time correction parameter for correcting that time error. The electronic timepiece W receives a satellite signal (radio waves) transmitted from one GPS satellite 8 and uses an accurate time (time information) obtained using the time correction parameter and the GPS time information included in the satellite signal as the internal time.

The satellite signal also includes orbit information indicating a position of the GPS satellite 8 on the orbit. The electronic timepiece W can execute positioning calculation using the GPS time information and the orbit information. The positioning calculation is executed on the assumption that an error is included in a measured time of the internal time of the electronic timepiece W to some extent. That is, a time error is also unknown in addition to x, y, and z parameters for specifying a 3-dimensional position of the electronic timepiece W. Therefore, the electronic timepiece W receives satellite signals transmitted generally from four or more GPS satellites 8, executes the positioning calculation using the GPS time information and the orbit information included in the satellite signals, and obtains positional information of the current site.

Description of Overall Configuration of Electronic Timepiece W

Figure 2:
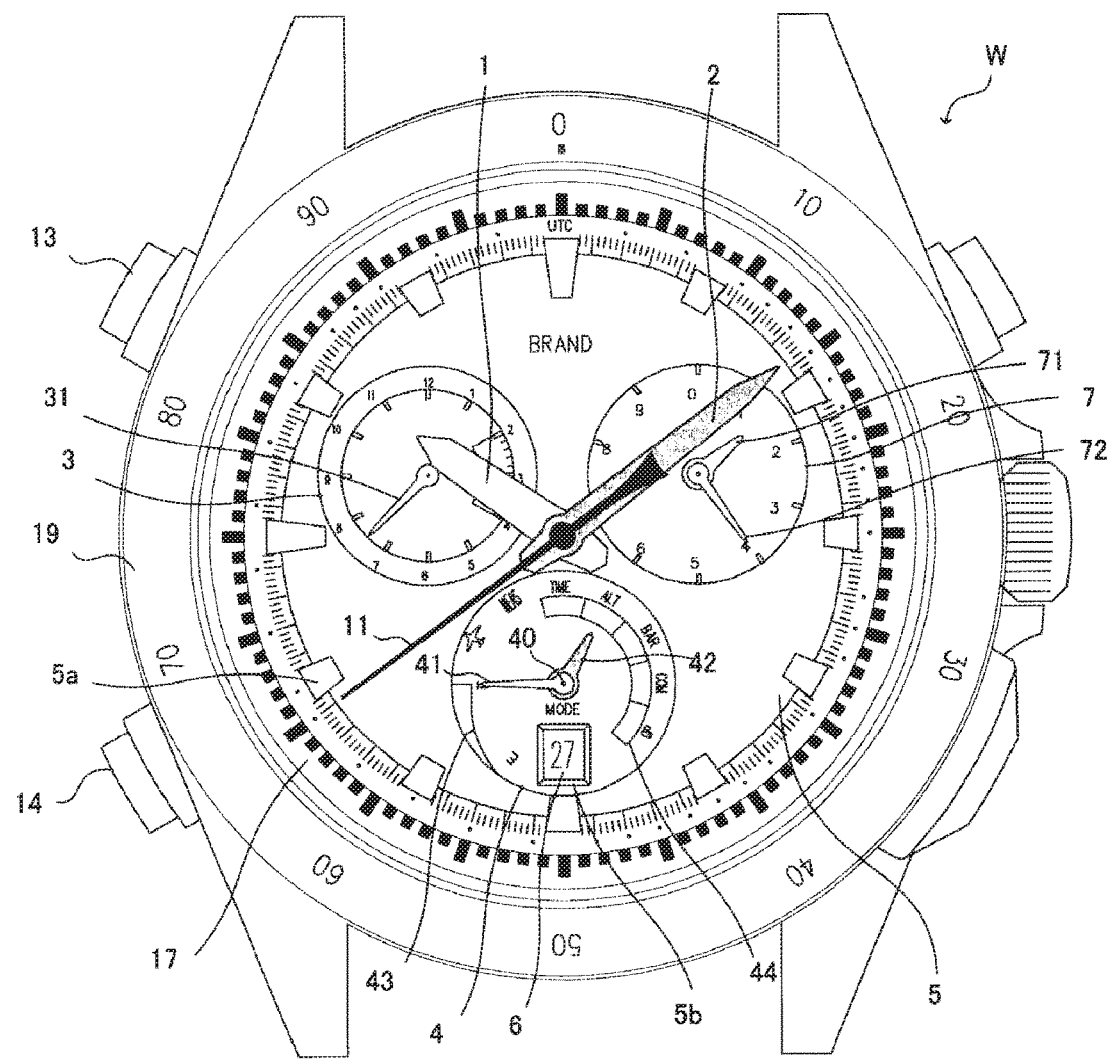
FIG. 2 is a plan view illustrating an example of the electronic timepiece according to the embodiment.
Figure 3:
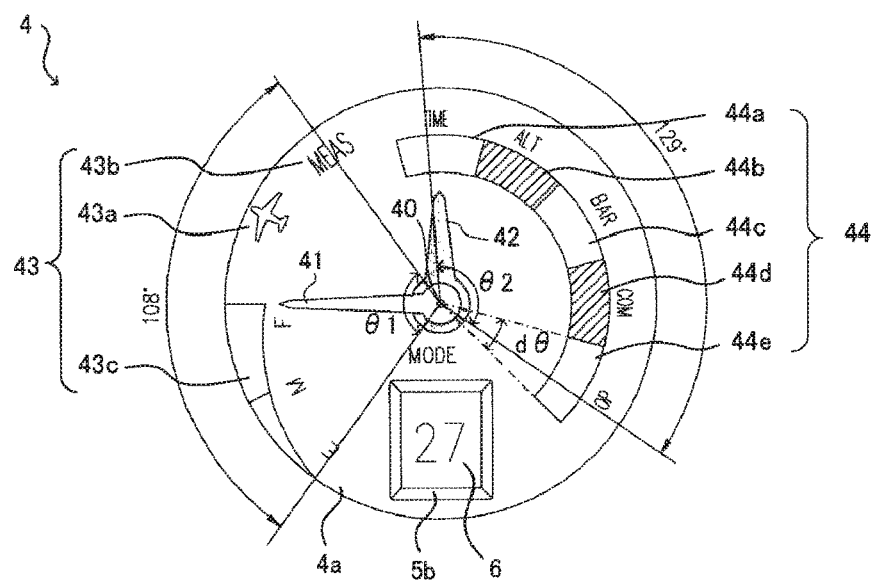
FIG. 3 is a plan view illustrating a 6 o'clock information display unit in an expansion manner.

FIG. 2 is a plan view illustrating the electronic timepiece W. FIG. 3 is a plan view illustrating a circular information display unit on the 6 o'clock side (hereinafter referred to as a "6 o'clock information display unit") 4 of the electronic timepiece W illustrated in FIG. 2 in an expansion manner.

Next, a schematic configuration of the electronic timepiece W will be described with reference to FIGS. 2 and 3.

As will be described below, the electronic timepiece W includes an altitude sensor, an azimuth sensor, and a barometric sensor.

The electronic timepiece W has, as display modes, a time display mode in which a time is displayed, an altitude display mode in which an altitude is displayed, an azimuth display mode in which an azimuth is displayed, a barometric display mode in which a barometric pressure is displayed, and an option display mode.

In the time display mode, a chronograph function (stop watch function) is validated in addition to time display.

In the option display mode, for example, a device such as a pulse sensor that measures biological information or the like is connected to the electronic timepiece W in a wireless or wired manner. The option display mode is a mode in which the biological information measured by the device is displayed. The option display mode is not limited to a mode in which the biological information is displayed, but may be appropriately changed.

As illustrated in FIGS. 2 and 3, the display mode is switched according to switching of a region pointed with a first display hand 42 in a 6 o'clock information display unit 4.

As illustrated in FIG. 3, in the 6 o'clock information display unit 4, an "ALT" region 44b corresponding to the altitude display mode, a "BAR" region 44c corresponding to the barometric display mode, and "COM" region 44d corresponding to the azimuth display mode are arranged in a line in the sequence of the "ALT" region 44b, the "BAR" region 44c, and the "COM" region 44d. The "ALT" region 44b, the "BAR" region 44c, and the "COM" region 44d are examples of first, second, and third regions.

A region ("TIME" region) 44a corresponding to the time display mode is disposed on the opposite side which is the side of the "BAR" region 44c of the "ALT" region 44b. A region ("OP" region) 44e corresponding to the option display mode is disposed on the opposite side which is the side of the "BAR" region 44c of the "COM" region 44d.

The first display hand 42 points the "TIME" region 44a to display that the display mode is the time display mode. The first display hand 42 points the "ALT" region 44b to display that the display mode is the altitude display mode. The first display hand 42 points the "BAR" region 44c to display that the display mode is the barometric display mode. The first display hand 42 points the "COM" region 44d to display that the display mode is the azimuth display mode. The first display hand 42 points the "OP" region 44e to display that the display mode is the option display mode.

Then, in a rotation direction (a revolving direction) of the first display hand 42, a distance between the "ALT" region 44b and the "BAR" region 44c is shorter than a distance between the "COM" region 44d and the "ALT" region 44b. Further, a distance between the "BAR" region 44c and the "COM" region 44d is shorter than a distance between the "COM" region 44d and the "ALT" region 44b. Here, the distance between the "COM" region 44d and the "ALT" region 44b in the rotation direction (revolving direction) of the first display hand 42 means a distance between the "COM" region 44d and the "ALT" region 44b in the rotation direction (the revolving direction) of the first display hand 42 without passing through the "BAR" region 44c.

In this way, the region 44b corresponding to the altitude display mode, the region 44c corresponding to the barometric display mode, and the region 44d corresponding to the azimuth display mode are disposed together in the rotation direction of the first display hand 42. Therefore, the region 44b corresponding to the altitude display mode, the region 44c corresponding to the barometric display mode, and the region 44d corresponding to the azimuth display mode are easily viewed at a time compared to a case in which the region 44b corresponding to the altitude display mode, the region 44c corresponding to the barometric display mode, and the region 44d corresponding to the azimuth display mode are not disposed together. Accordingly, it is possible to easily recognize whether the display mode pointed by the first display hand 42 is the altitude display mode, the barometric display mode, or the azimuth display mode.

In everyday life, a use frequency of the time display mode is high. Therefore, the "TIME" region 44a (corresponding to the time display mode) is disposed at the position of 12:00 which is the easiest to view. In a use scene in outdoor sports such as mountain climbing, there is a high possibility of the altitude display mode, the barometric display mode, and the azimuth display mode being used.

An altitude in the altitude display mode, a barometric pressure in the barometric display mode, and a pulse in the option display mode are displayed by a circular information display unit 7 on the 2 o'clock side (hereinafter referred to as a "2 o'clock information display unit") of the electronic timepiece W illustrated in FIG. 2 and a scale and measurement display hand 11 for which the circular dial ring 17 is partitioned into 100 scales.

Specifically, in the 2 o'clock information display unit 7, a measurement display hand 71 displays a value of the 1000 place of measured values (altitude, barometric pressure, and pulse) and a measurement display hand 72 displays a value of the 100 place of the measured values. The measurement display hand 11 displays a value of the 10 place and a value of the 1 place of the measured values using the scales (100 partitions) of the dial ring 17.

For example, in a case in which the first display hand 42 in the 6 o'clock information display unit 4 points the "ALT" region 44b, the measured value of the altitude is displayed by the 2 o'clock information display unit 7 and the measurement display hand 11. In a case in which the first display hand 42 in the 6 o'clock information display unit 4 points the "BAR" region 44c, the measured value of the barometric pressure is displayed by the 2 o'clock information display unit 7 and the measurement display hand 11.

An azimuth in the azimuth display mode is displayed when the measurement display hand 11 points the azimuth of the north. That is, in a case in which the first display hand 42 in the 6 o'clock information display unit 4 points the "COM" region 44d, the azimuth of the north is displayed by the measurement display hand 11.

In the time display mode, a time is displayed using an hour hand 1 indicating an hour, a minute hand 2 indicating a minute, and a circular information display unit 3 on the 10 o'clock side (hereinafter referred to as a "10 o'clock information display unit") of the electronic timepiece W indicating a second. That is, in a case in which the first display hand 42 in the 6 o'clock information display unit 4 points the "TIME" region 44a, a time is displayed using the hour hand 1, the minute hand 2, and the 10 o'clock information display unit 3. The hour hand 1 and the minute hand 2 point a time (an hour and a minute) in any display mode other than the time display mode.

Here, when FIGS. 2 and 3 are supplemented, FIG. 2 is a diagram illustrating the electronic timepiece W when the display mode is the altitude display mode ("ALT") and FIG. 3 is a diagram illustrating the 6 o'clock information display unit 4 when the display mode is the time display mode ("TIME").

The details of the electronic timepiece W will be described.

In FIG. 2, the electronic timepiece W receives radio waves containing time information and corrects a display time based on the time information. In the electronic timepiece W, a letter plate 5 is disposed on the inner circumferential side of the dial ring 17 and the bezel 19 is disposed on the outer circumferential side of the dial ring 17 in a form circularly concentric with the dial ring 17. The hour hand 1 and the minute hand 2 are mounted on the letter plate 5. At a position corresponding to the hour hand 1 of the letter plate 5, a scale 5a on a 12-hour clock is formed in an annular shape. In a direction indicating 10 o'clock of the letter plate 5, the 10 o'clock information display unit 3 on which a second hand 31 is mounted is formed.

The measurement display hand 11 is mounted on the letter plate 5. For example, in the altitude display mode, the measurement display hand 11 displays a value (a corresponding value among 0 to 99) indicated by a 1 place and a 10 place in a measurement result based on an output from the altitude sensor that measures an altitude. Specifically, the measurement display hand 11 displays a numeral of a 1 place and a 10 place in a measurement result of an altitude using the 100 partitioned scales in the dial ring 17. The 2 o'clock information display unit 7 in which the measurement display hands 71 and 72 displaying a 100 place and a 1000 place in the measurement result of the altitude are fitted is formed in the direction indicating 2 o'clock of the letter plate 5. In the illustrated example, the measurement display hands 71 and 72 indicate an altitude of 1400 m and the measurement display hand 11 indicates an altitude of 65 m. Thus, the user can understand that the altitude is 1465 m.

The 6 o'clock information display unit 4 in which the first display hand 42 displaying first information and the second display hand 41 displaying second information are fitted is disposed in the direction indicating 6 o' clock of the letter plate 5. The first information and the second information are information other than a time.

As illustrated in detail in FIG. 3, a letter plate 4a of the 6 o'clock information display unit 4 includes a first display region 44 and a second display region 43. The first display region 44 and the second display region 43 are disposed to be adjacent to each other so that the regions 44 and 43 do not overlap each other. The letter plate 4a is an example of a member.

The second display region 43 is a range formed in a fan shape in which a central angle centering on a concentric axis 40 is $\theta 1$ (108°). The second display region 43 is an example of a specific region or an example of a region which can be pointed by the second display hand 41.

The first display region 44 is a range which is formed in an arc shape in which a central angle centering on the concentric axis 40 is $\theta 2$ (129°). The first display region 44 is an example of a predetermined region or an example of a region which can be pointed by the first display hand 42. The display regions 43 and 44 are partitioned into a plurality of display units in accordance with a rotation angle in the concentric axis 40.

A region (43c) indicating a battery residual quantity and regions (43a and 43b) indicating operation states of the electronic timepiece W are installed in the second display region 43. The second display hand 41 displays a battery residual quantity by pointing a region indicting the battery residual quantity. The second display hand 41 displays an operation state of the electronic timepiece W by pointing a region indicating an operation state of the electronic timepiece W.

The operation states of the electronic timepiece W include "wireless stop progress" meaning reception stop of radio waves containing time information and "measurement progress" meaning that measurement corresponding to the display mode displayed by the first display hand 42 (measurement of a time in altitude, azimuth, or barometric pressure, or a stop watch function) is being executed.

In the embodiment, a battery residual quantity meter 43c, an icon 43a indicating wireless stop progress, and a "MEAS" letter 43b indicating "measurement progress" are installed in the second display region 43. A region in which the battery residual quantity meter 43c is located is an example of a fifth region. A region in which the icon 43a is located and a region in which the "MEAS" letter 43b is located are examples of a fourth region corresponding to an operation state of the electronic timepiece W. The region in which the "MEAS" letter 43b is located is also an example of a sixth region. The region in which the "MEAS" letter 43b is located is adjacent to the first display region 44.

The second display hand 41 selectively displays a battery residual quantity and an operation state of the electronic timepiece W through rotation about the concentric axis 40 in the second display region 43.

On the other hand, the first display hand 42 displays a current display mode (one of the time display mode, the altitude display mode, the azimuth display mode, the barometric display mode, and the option display mode) through rotation about the concentric axis 40 in the first display region 44.

Each display mode also indicates a measured value in the display mode. For example, the time display mode indicates a time or an hour as a kind of measured value, the altitude display mode indicates an altitude as a kind of measured value, the azimuth display mode indicates an azimuth as a kind of measured value, the barometric display mode indicates a barometric pressure as a kind of measured value, and the option display mode indicates biological information as a kind of measured value.

The first display hand 42 is driven by a deceleration mechanism that decelerates rotation of the second display hand 41 and rotates the first display hand 42.

The second display hand 41 moves in the range of 108° from the "MEAS" position to the "E" position (emptiness; an empty position) in a range of ±54° centering on an "F" position (a full position) and displays second information (a battery residual quantity and an operation state of the electronic timepiece W).

In a case in which the second display hand 41 moves in a range of 54° from the "MEAS" position to the "F" position and a case in which the second display hand 41 moves in a range of 54° from the "F" position to the "E" position, a display position of the first display hand 42 is moved in a range of 4.5° by the above-described deceleration mechanism. Here, display units of the display modes (the "TIME" region, the "ALT" region, the "BAR" region, the "COM" region, and the "OP" region) 44a to 44e are ranges of 30° (=0±15°). Therefore, even when the first display hand 42 rotates in the range of 4.5° with rotation of the second display hand 41, a region (display unit) pointed by the first display hand 42 is not changed and there is a low possibility of the user erroneously reading a display mode pointed by the first display hand 42. The angle 30° (±15°) is an example of an angle dθ.

When a wireless function (a function of receiving radio waves containing time information) is not usable as in a case in which a user carrying the electronic timepiece W is boarding on an airplane and the user manipulates a button, the second display hand 41 points the icon 43a indicating wireless stop progress.

The first display region 44 includes the "TIME" region 44a, the "ALT" region 44b, the "BAR" region 44c", the "COM" region 44d, and the "OP" region 44e.

In the first display region 44, a current display mode is displayed by selectively pointing display units (the "TIME" region, the "ALT" region, the "BAR" region, the "COM" region, and the "OP" region) 44a to 44e of the display modes by the first display hand 42.

In the embodiment, the display units 44a to 44e of the display modes are indicated by letters written in a region formed in a belt-like arc shape. Specifically, "TIME" (time), "ALT" (altitude), "BAR" (barometric pressure), "COM" (compass: azimuth), and "OP" (option) are indicated as the display units 44a to 44e.

The display mode displayed at a position pointed by the first display hand 42, that is, the display mode displayed in the first display region 44, can be switched through a manipulation of pressing a button 14.

For example, whenever the button 14 is pressed once, the second display hand 41 rotates rightward at 360° and the first display hand 42 rotates rightward 30° which is an example of the angle dθ. Therefore, whenever the button 14 is pressed once, the display mode is switched sequentially from the time display mode (the "TIME" mode) to the altitude display mode (the "ALT" mode), the barometric display mode (the "BAR" mode), the azimuth display mode (the "COM" mode), and the option display mode (the "OP" mode).

When the button 14 is pressed in a situation in which the first display hand 42 points the option display mode (the "OP" mode), the first display hand 42 is reversed to move to the "TIME" region 44a (the region of the time display mode).

In the example illustrated in FIG. 3, the second display hand 41 points the battery residual quantity "F" (full) and the first display hand 42 points the time display mode.

An information display unit 5b that transmits a date wheel 6 displaying a calendar is formed in a direction in which 6 o'clock of the letter plate 4a of the 6 o'clock information display unit 4 is pointed. The information display unit 5b displays a date of a calendar which is an example of third information. The information display unit 5b is disposed to be fixed on a straight line binding the 12 o'clock side and the 6 o'clock side and passing through the concentric axis 40 so that the symmetric design of the entire electronic timepiece W is realized.

Figure 4:
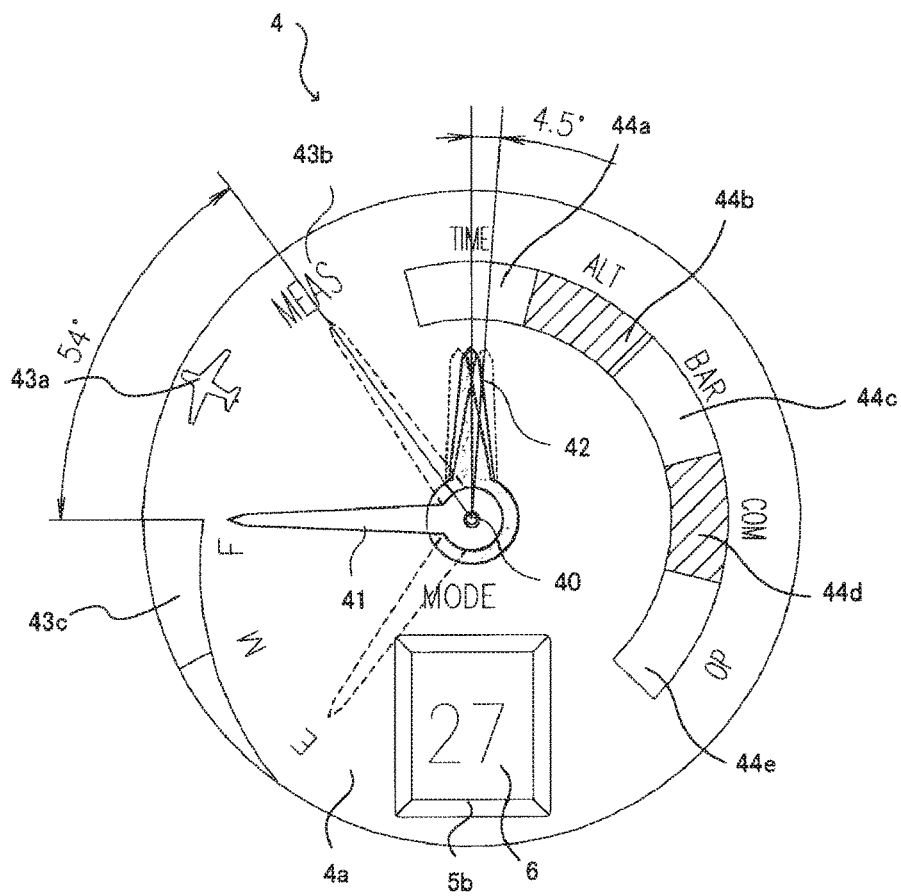
FIG. 4 is a plan view illustrating a rotation range of a first display hand interlocked with a rotation range of a second display hand.

FIG. 4 is a diagram illustrating a rotation range of the first display hand 42 interlocked with the rotation range of the second display hand 41. In the example illustrated in FIG. 4, the first display hand 42 points the display unit 44a (the "TIME" region). In a casein which the first display hand 42 points the display unit 44a, the display mode is the time display mode.

In the time display mode, as described above, the chronograph function (stop watch function) is validated in addition to the time display.

When a button 13 is pressed in the state illustrated in FIG. 3, the electronic timepiece W starts the chronograph function. In the chronograph function, the measurement display hand 11 illustrated in FIG. 2 starts operating at intervals of 1/5 seconds. Simultaneously, as illustrated in FIG. 4, the second display hand 41 of the 6 o'clock information display unit 4 rotates rightward at 54° from the position indicating the "F" of the battery residual quantity to move to the position indicating the "MEAS" letter 43b meaning measurement progress. At this time, the first display hand 42 rotates rightward at 4.5° with the interlock rotation of the second display hand 41. Here, the display unit 44a of the "TIME" region has a width of 30°. Accordingly, the first display hand 42 still points the display unit 44a of the "TIME" region. Similarly, in a case in which the second display hand 41 rotates leftward at 54° from the position indicating "F" of the battery residual quantity and points "E" of the battery residual quantity, the first display hand 42 rotates leftward at 4.5°, but still points the display unit 44a of the "TIME" region.

Configuration of Driving System

Figure 5:
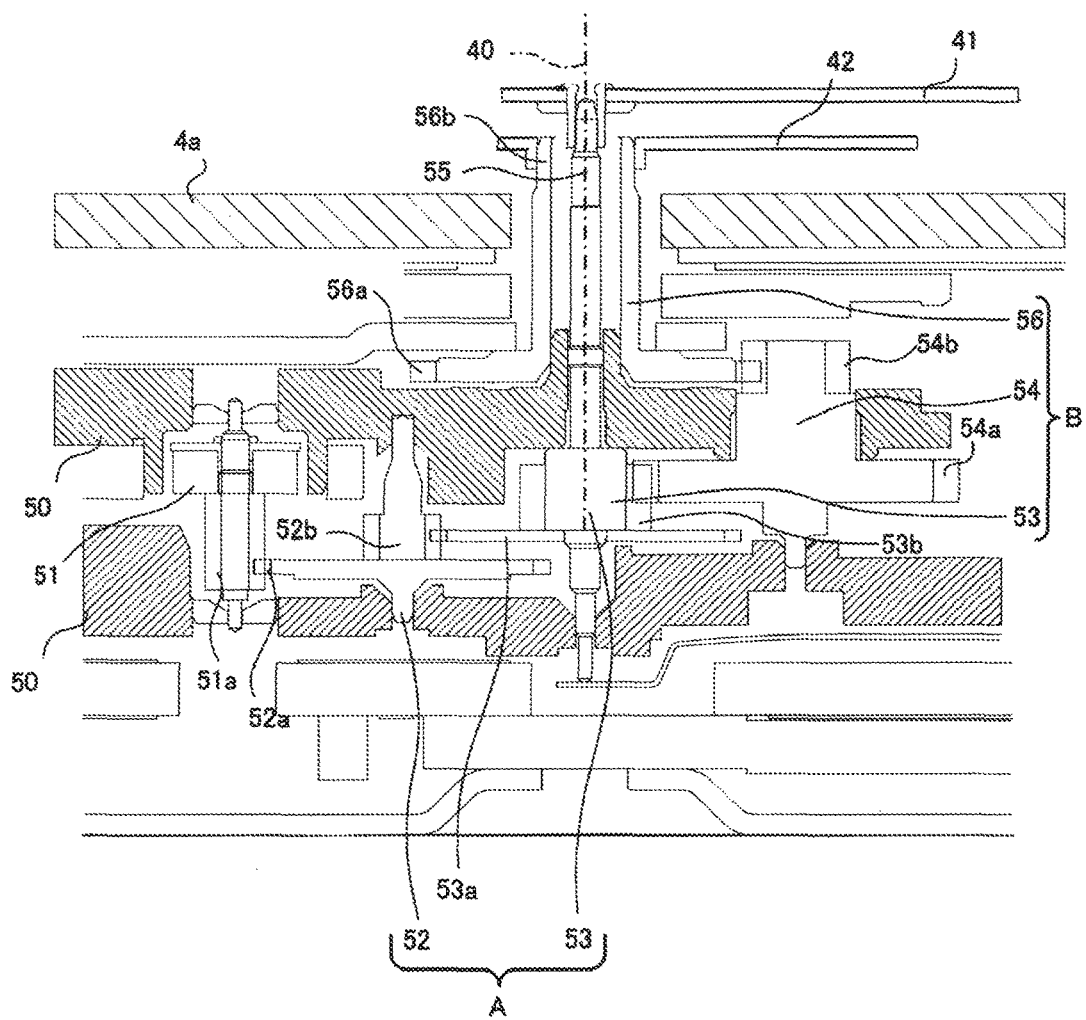
FIG. 5 is a sectional view illustrating a driving system of the 6 o'clock information display unit.
Figure 6:
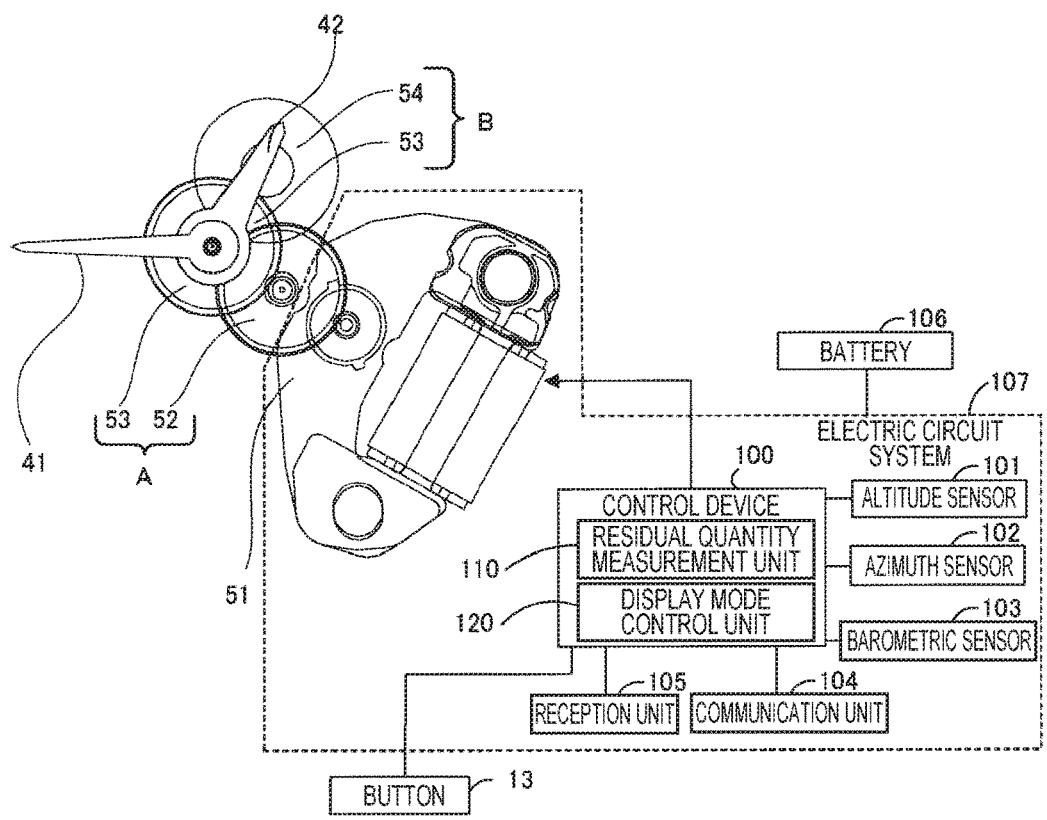
FIG. 6 is a plan view illustrating the driving system of the 6 o'clock information display unit.

A driving system of the display hands will be described. FIG. 5 is a sectional view illustrating the configuration of the 6 o'clock information display unit 4 according to the embodiment. FIG. 6 is a plan view illustrating the driving system and the like.

As illustrated in FIGS. 5 and 6, the first display hand 42 and the second display hand 41 are driven by a common step motor 51 and rotate about the same axis via an intermediate wheel 52 or 54. The electronic timepiece W includes a power transmission mechanism. A that rotates the second display hand 41 at a first speed with a driving force from the step motor 51 which is a driving source and a deceleration mechanism B that decelerates the rotation of the second display hand 41 and rotates the first display hand 42 at a second speed. The step motor 51, the power transmission mechanism A, and the deceleration mechanism B configure a driving unit. The power transmission mechanism A and the deceleration mechanism B use the step motor 51 as a common driving source. In the power transmission mechanism A and the deceleration mechanism B, some of the gear wheels are commonly used. Specifically, the power transmission mechanism A includes the intermediate wheel 52 and a battery residual quantity display wheel 53. The deceleration mechanism B includes a battery residual quantity display wheel 53, the intermediate wheel 54, and a mode display wheel 56. The battery residual quantity display wheel 53 rotates so that the second display hand 41 can selectively point not only the battery residual quantity meter 43c but also the icon 43a meaning wireless top progress or the "MEAS" letter 43b indicating measurement progress.

More specifically, the step motor 51 is a driving source that drives the first display hand 42 and the second display hand 41. The step motor 51 includes a coil block, a stator, and a rotor 51a. The step motor 51 rotates when a driving pulse is supplied. The coil block is configured to include a magnetic core formed of a material with high magnetic permeability, a coil wound around the magnetic core, a coil lead substrate of which both ends are processed to be conductive, and a coil frame. The stator is formed of a material with high magnetic permeability as in the magnetic core. In the rotor 51a, a portion formed of metal is mounted on a rotor magnet. For example, a coin-shaped lithium battery is used as a power supply of the driving source of the step motor 51. A direct-current voltage of 3 V is applied to the coil block.

The step motor 51 is rotated by a driving pulse output from a control device 100 such as a CPU-IC (see FIG. 6). The control device 100 is an example of a control unit.

The control device 100 is an arithmetic processing device that controls an operation of the entire electronic timepiece W. The control device 100 receives, for example, a button manipulation by the user via the button 13 and is connected to an altitude sensor 101, an azimuth sensor 102, a barometric sensor 103, a communication unit 104, and a reception unit 105.

An electric circuit system 107 including the control device 100, the altitude sensor 101, the azimuth sensor 102, the barometric sensor 103, the communication unit 104, the reception unit 105, and the step motor 51 is driven using a battery 106 as a power supply.

The control device 100 also functions as a residual quantity measurement unit 110 that measures a battery residual quantity and a display mode control unit 120 that controls the display mode. The control device 100 outputs a driving pulse of the step motor 51 according to a button manipulation by the user and controls each display on the 6 o'clock information display unit 4.

The altitude sensor 101 measures an altitude. The azimuth sensor 102 measures an azimuth. The barometric sensor 103 measures a barometric pressure. The communication unit 104 communicates with a device that measures biological information of a pulse sensor or the like used in the option display mode in a wireless or wired manner. The reception unit 105 includes an antenna and processes satellite signals received via the antenna to acquire GPS time information or positional information.

The control device 100 drives the first display hand 42 and the second display hand 41 by driving the step motor 51. The control device 100 drive the hour hand 1, the minute hand 2, the second hand 31, the date wheel 6, the measurement display hands 11, 71, and 72 via driving mechanisms (not illustrated) to display a measured value of the altitude sensor 101, a measured value of the azimuth sensor 102, a measured value of the barometric sensor 103, biological information acquired by the communication unit 104, an internal time corrected with time information acquired using the reception unit 105.

As illustrated in FIG. 5, the rotor 51a of the step motor 51 engages with a lower gearwheel 52a of the intermediate wheel 52 and rotates a lower gear wheel 53a of the battery residual quantity display wheel 53 via an upper gear wheel 52b rotated integrally with the lower gear wheel 52a. The battery residual quantity display wheel 53 rotates integrally with a rotation shaft 55. The rotation shaft 55 rotates about the above-described concentric axis 40. The rotation shaft 55 rotates about the concentric axis 40 via the battery residual quantity display wheel 53, and thus the second display hand 41 operates.

An upper gear wheel 53b of the battery residual quantity display wheel 53 rotates integrally with the lower gear wheel 53a. The battery residual quantity display wheel 53 rotates a lower gear wheel 54a of the intermediate wheel 54 via the upper gear wheel 53b. The lower gear wheel 54a of the intermediate wheel 54 rotates integrally with an upper gear wheel 54b disposed on the front side of the ground plate 50 (the side of the letter plate 4a). The intermediate wheel 54 rotates a gear wheel 56a of a mode display wheel 56 via the upper gear wheel 54b. The mode display wheel 56 includes a cylindrical portion 56b which is internally hollow. The cylindrical portion 56b is fitted to the outer circumference surface of the rotation shaft 55. The cylindrical portion 56b rotates about the concentric axis 40 similarly with the rotation shaft 55. The first display hand 42 operates by rotation of the cylindrical portion 56b.

The first display region 44 is partitioned in a plurality of display units in accordance with the rotation angle $d\theta$ of the concentric axis 40 (see FIG. 3). When a deceleration ratio of the deceleration mechanism B is $1/N$, the angle $d\theta$ is set so that Formula 1 is satisfied.

$$d\theta > \theta 1/N \qquad \text{Formula 1}$$

In the embodiment, the angle $d\theta$ is set to 30°.

More specifically, a deceleration ratio of each gear wheel in the power transmission mechanism A is set in the second display hand 41 so that the second display hand 41 revolves once (revolves at 360°) when the step motor 51 is set to 40 steps. Therefore, the second display hand 41 operates at intervals of angles obtained by dividing 360° by 40.

On the other hand, a deceleration ratio of the deceleration mechanism B is set in the first display hand 42 so that the first display hand 42 rotates at 30° equivalent to one display unit while the second display hand 41 revolves once.

When the button 14 is pressed once, the second display hand 41 revolves once (360°), the first display hand 42 progresses by one scale (one display unit) (30°), and the display mode is switched.

The reason why the deceleration ratio $1/N$ of the deceleration mechanism B, the angle $\theta 1$ of a maximum range in which the second display hand 41 swings, and the angle $d\theta$ of one display unit in the first display region 44 are decided in Formula 1 is as follows.

The maximum range in which the second display hand 41 swings is the angle $\theta 1$. Since the deceleration ratio of the deceleration mechanism B is $1/N$, the first display hand 42 rotates by $1/N$ of the predetermined angle when the second display hand 41 rotates at the predetermined angle. Accordingly, even when the second display hand 41 rotates at the angle $\theta 1$, the first display hand 42 rotates only at an angle $\theta 1/N$. Here, $d\theta > \theta 1/N$ is satisfied. Therefore, even when the second display hand 41 rotates only the angle $\theta 1$, a swing angle of the first display hand 42 is less than the angle $d\theta$ of a display unit in the first display region 44. Accordingly, in a case in which information pointed by the second display hand 41 is changed, it is possible to reduce a probability that information (the display mode) pointed by the first display hand 42 is erroneously read.

The angle $d\theta$ may be set so that a relation of Formula 2 can be satisfied instead of Formula 1.

$$d\theta/2 > \theta 1/N \qquad \text{Formula 2}$$

In this case, when the second display hand 41 rotates at the angle θ1, the first display hand 42 rotates at the angle θ1/N. The angle θ1/N is less than half of the angle dθ of the display unit in the first display region 44. Accordingly, it is possible to reduce an influence of the rotation of the second display hand 41 on the first display hand 42.

In the electronic timepiece W according to the above-described embodiment, the "ALT" region 44*b*, the "BAR" region 44*c*, and the "COM" region 44*d* are disposed in a line in the sequence of the "ALT" region 44*b*, the "BAR" region 44*c*, and the "COM" region 44*d* in the information display unit 4.

Then, in a rotation direction (a revolving direction) of the first display hand 42, a distance between the "ALT" region 44*b* and the "BAR" region 44*c* is shorter than a distance between the "COM" region 44*d* and the "ALT" region 44*b*. Further, a distance between the "BAR" region 44*c* and the "COM" region 44*d* is shorter than a distance between the "COM" region 44*d* and the "ALT" region 44*b*.

Accordingly, the region 44*b* corresponding to the altitude display mode, the region 44*c* corresponding to the barometric display mode, and the region 44*d* corresponding to the azimuth display mode are disposed together in the rotation direction of the first display hand 42. Therefore, the region 44*b* corresponding to the altitude display mode, the region 44*c* corresponding to the barometric display mode, and the region 44*d* corresponding to the azimuth display mode are easily viewed at a time compared to a case in which the region 44*b* corresponding to the altitude display mode, the region 44*c* corresponding to the barometric display mode, and the region 44*d* corresponding to the azimuth display mode are not disposed together. Accordingly, it is possible to easily recognize whether the display mode pointed by the first display hand 42 is the altitude display mode, the barometric display mode, or the azimuth display mode.

In the embodiment, the control device 100 controls the step motor 51 such that the first display hand 42 points the "ALT" region 44*b* in a case in which the display mode is the altitude display mode, the first display hand 42 points the "BAR" region 44*c* in a case in which the display mode is the barometric display mode, and the first display hand 42 points the "COM" region 44*d* in a case in which the display mode is the azimuth display mode.

Therefore, the control device 100 can control a position pointed by the first display hand 42 via the step motor 51.

When the user ascertains a state of the electronic timepiece W, the user can view a position pointed by the second display hand 41 to confirm an operation state of the electronic timepiece W and the battery residual quantity, and confirms a position pointed by the first display hand 42 to confirm the display mode of a current situation.

In the embodiment, the first display region 44 pointed by the first display hand 42 and the second display region 43 pointed by the second display hand 41 are adjacent to each other.

Therefore, when the user ascertains the state of the electronic timepiece W, the user can view the display mode displayed by the first display hand 42 and the operation state or the battery residual quantity displayed by the second display hand 41 at a time, and thus necessity of considerably moving a visual line is lowered. Accordingly, it is possible to obtain high visibility of display content of the first display hand 42 and display content of the second display hand 41.

In the embodiment, the first display hand 42 and the second display hand 41 rotate about the same axis.

Therefore, it is possible to achieve space saving more than in a case in which the first display hand 42 and the second display hand 41 rotate about different axes.

In the embodiment, the operation state displayed by the second display hand 41 includes a measurement progress state meaning that measurement corresponding to the display mode displayed by the first display hand 42 is being executed. The region of the "MEAS" letter 43*b* corresponding to the measurement progress state is adjacent to the first display region 44 pointed by the first display hand 42.

Therefore, the user can view display regarding whether the measurement corresponding to the display mode is being executed and the display mode pointed by the first display hand 42 and associated with the display at a time.

In the embodiment, the icon 43*a* indicating wireless stop progress is disposed near to "F" (full) of the battery residual quantity meter 43*c*.

In reception (wireless communication) of radio waves containing time information, use power is relatively large. Therefore, a condition for executing wireless communication is that the battery residual quantity is close to full charge ("F"). Accordingly, while the wireless communication is executed, it can be predicted that there is a high probability that the second display hand 41 points "F" of the battery residual quantity meter 43*c*. Accordingly, to switch a situation in which the wireless communication is executed fast to the wireless stop, the icon 43*a* indicating the wireless stop progress is preferably disposed near to "F" of the battery residual quantity.

In the embodiment, the second display hand 41 and the first display hand 42 are driven about the same axis by a driving force from one step motor 51. Therefore, the number of step motors can be reduced, the number of components such as gear wheels transmitting the driving force from the driving source can be reduced, and components such as the driving source or the gear wheels can be disposed for space saving. Thus, it is possible to achieve an improvement in the degree of freedom of miniaturization and design of the entire timepiece.

Figure 7:
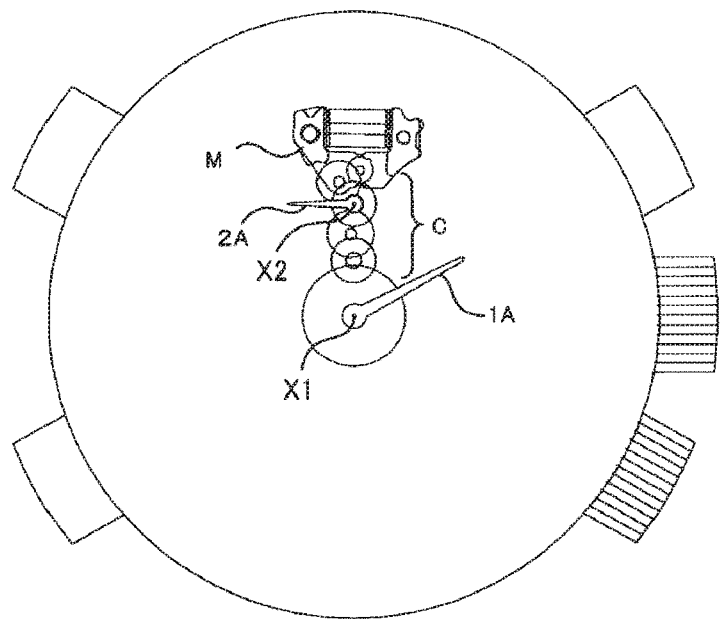
FIG. 7 is a plan view illustrating a driving system of the related art.

More specifically, as in the related art, for example, a configuration illustrated in FIG. 7 is used for a multifunction timepiece in which display is executed with two hands by one step motor.

In the example illustrated in FIG. 7, a driving force of a step motor M is transmitted to a first information display hand 1A and a second information display hand 2A using a power transmission mechanism C. However, a rotation shaft X1 of the first information display hand 1A is different from a rotation shaft X2 of the second information display hand 2A. That is, in a timepiece of the related art, an area for the power transmission mechanism transmitting the driving force of the step motor M to another rotation shaft is necessary and the number of components is large. However, as illustrated in FIGS. 5 and 6, the electronic timepiece W according to the embodiment executes display with two display hands driven about the same shaft, and thus disposition is realized for space saving in the entire timepiece.

In particular, in the embodiment, the first display region 44 is partitioned into a plurality of display units in accordance with angle dθ about the concentric axis 40. When a deceleration ratio of the deceleration mechanism B is 1/N, a relation of dθ>θ1/N is satisfied. Therefore, even when the second display hand 41 advances by one scale within a range of the angle θ1, the advance of the first display hand 42 can remain minutely. In this way, since a width is allowed in the display unit of the first display region 44, it is possible to prevent display information of the first display hand 42 from being erroneously read at the time of switching of the display information of the second display hand 41.

In the embodiment, the second display region 43 is set to be in a range in which a central angle is θ1 (108°), the first display region 44 is set to be in a range in which a central angle is θ2 (129°) and which does not overlap the second display region 43, and the second display region 43 and the first display region 44 are disposed with the concentric axis 40 interposed therebetween. Therefore, the second display region 43 and the first display region 44 are disposed to face each other without overlapping each other and the first information and the second information are easily distinguished from each other. Thus, it is possible to read the first information and the second information more easily.

In the embodiment, in a region in which the second display region 43 and the first display region 44 do not overlap each other, on a straight line passing through the concentric axis 40 and binding the 12 o'clock side and the 6 o'clock side, the information display unit 5b displaying the date wheel 6 of a calendar is disposed to be fixed as a third display region in which the third information is displayed. Therefore, a symmetric property of design can be emphasized, and thus it is possible to improve stability of design.

MODIFICATION EXAMPLES

The invention is not limited to the above-described embodiment. For example, various modification examples to be described below can be realized. Further, one modification example or a plurality of modification examples selected arbitrarily from the modification embodiments to be described below can also be appropriately combined.

In the above-described embodiment, as illustrated in FIGS. 2 and 3, display of the battery residual quantity meter 43c is divided into 3 stages of "E" (empty), "M" (middle), and "F" (full), but the number of display stages of the battery residual quantity meter 43c is not limited to 3 and can be appropriately changed.

Figure 8:
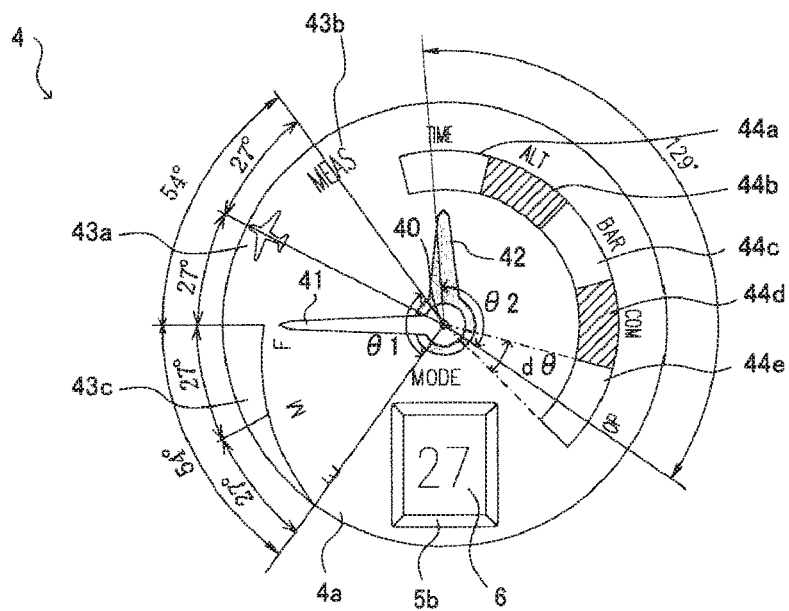
FIG. 8 is a plan view illustrating an example of the 6 o'clock information display unit.
Figure 9:
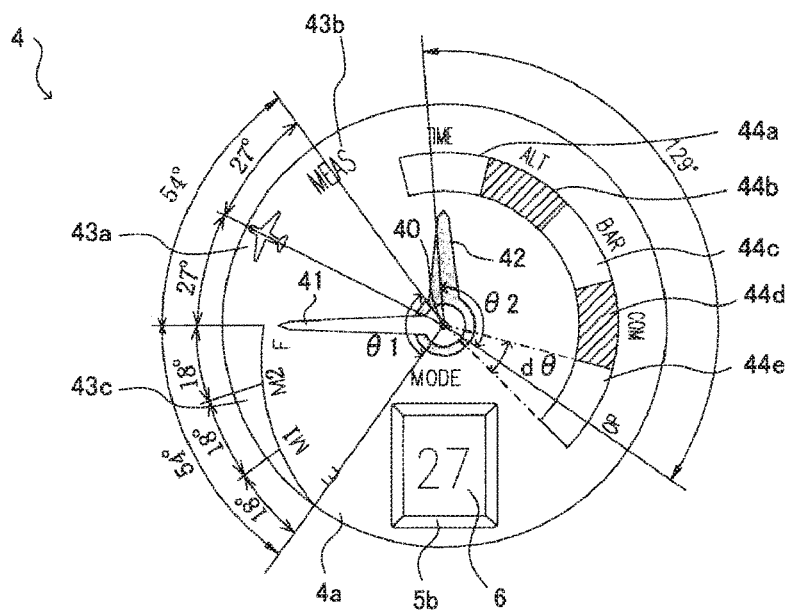
FIG. 9 is a plan view illustrating a modification example of the 6 o'clock information display unit.

FIG. 8 is a diagram illustrating an example of divided angles of the battery residual quantity meter 43c in a case in which display of the battery residual quantity meter 43c is divided into 3 stages, as illustrated in FIGS. 2 and 3. FIG. 9 is a diagram illustrating an example of divided angles of the battery residual quantity meter 43c in a case in which display of the battery residual quantity meter 43c is divided into 4 stages ("E", "M1" (middle 1), "M2" (middle 2), and "F"). Here, a relation of "M1"<"M2" is assumed to be established as the battery residual quantity. In either the case of the example illustrated in FIG. 8 or the case of the example illustrated in FIG. 9, the battery residual quantity meter 43c is a region in which a central angle is 54° on the letter plate 4a.

As illustrated in FIG. 8, in a case in which the display of the battery residual quantity meter 43c is divided into 3 stages, the battery residual quantity meter 43c can be divided into "E", "M", and "F" at a central angle 27° on the letter plate 4a. On the other hand, as illustrated in FIG. 9, in a case in which the display of the battery residual quantity meter 43c is divided into 4 stages, the battery residual quantity meter 43c can be divided into "E", "M1", "M2", and "F" at a central angle 18° on the letter plate 4a.

At this time, the second display hand 41 preferably operates at intervals of angles obtained by diving 360° by 4n (where n is a natural number less than 15). Hereinafter, this point will be described.

For example, in a case in which the second display hand 41 is configured to operate at the intervals of the angles obtained by diving 360° by 4n, the second display hand 41 is used for many timepieces. It is difficult to achieve common use of the driving mechanism and components operating the pointing hand at intervals of angles obtained by dividing 360° by 60. However, it is possible to lengthen a distance by which the second display hand 41 advances in an one-time operation and it is possible to shorten the number of operations (that is, a switching time) associated with switching of the display to 2/3.

The invention is not limited to the modification example. In a case in which the second display hand 41 is configured to operate at the intervals of the angles obtained by diving 360° by 4n, the 6 o'clock information display unit 4 can execute display symmetrically on the upper, lower, left, and right sides (here, the upper, lower, left, and right sides correspond to the 12 o'clock side, the 6 o'clock side, the 9 o'clock side, and the 3 o'clock side) with the second display hand 41. Even in a case in which the battery residual quantity meter 43c is configured, as illustrated in FIG. 8 or 9, the second display hand 41 can also correspond to any display (a battery residual quantity meter of 3 divisions and a battery residual quantity meter of 4 divisions), for example, by configuring the second display hand 41 operating at the intervals of the angles obtained by diving 360° by 4n.

Figure 10:
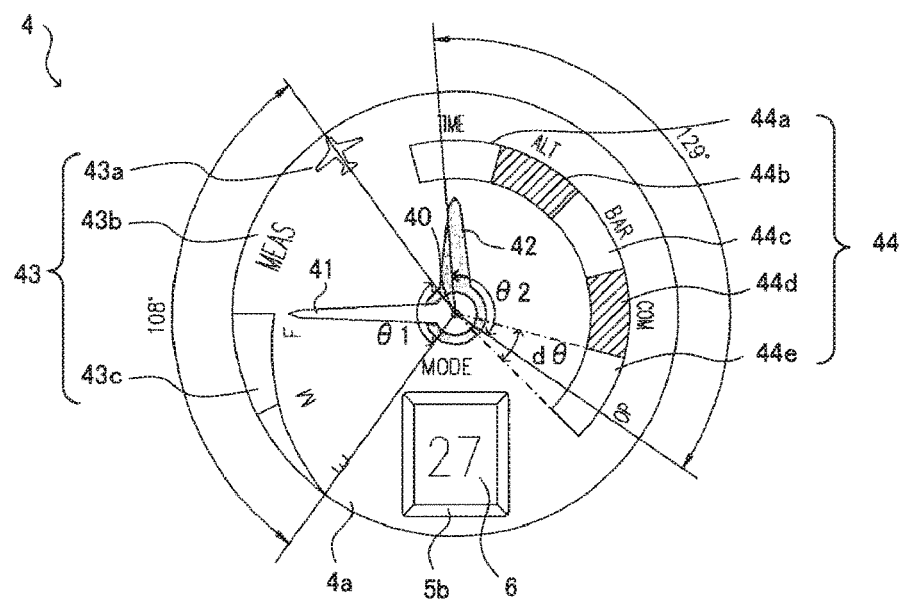
FIG. 10 is a plan view illustrating another modification example of the 6 o'clock information display unit.
Figure 11:
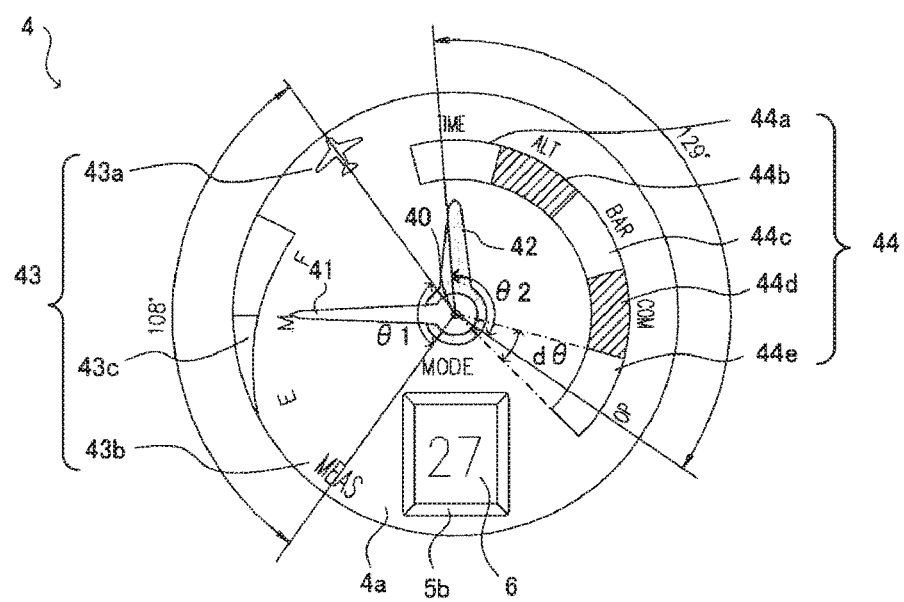
FIG. 11 is a plan view illustrating still another modification example of the 6 o'clock information display unit.

In the 6 o'clock information display unit 4 illustrated in FIG. 2 or 3, the region in which the icon 43a is disposed and the region in which the "MEAS" letter 43b is disposed may be exchanged, as illustrated in FIG. 10. As illustrated in FIG. 11, the battery residual quantity meter 43c may be disposed between the region in which the icon 43a is disposed and the region in which the "MEAS" letter 43b is disposed.

In the case of the example illustrated in FIG. 10 or 11, the vicinity of the battery residual quantity meter 43c serves as a region of the "MEAS" letter 43b.

The measurement of a barometric pressure, an altitude, and an azimuth is considered to be frequently used in accordance with a situation of a use scene at the time of mountain climbing or yacht voyage (for example, a use scene at the time of bad weather). Therefore, the vicinity of the battery residual quantity meter 43c can serve as the region of the "MEAS" letter 43b and it is possible to reduce the number of driving steps of the step motor 51 necessary to switch the position pointed by the second display hand 41 from the region of the battery residual quantity meter 43c to the region of the "MEAS" letter 43b. Accordingly, it is possible to achieve a reduction in power consumption.

Modification Example A of Arrangement Sequence of "ALT" Region 44b, "BAR" Region 44c, and "COM" Region 44d

Figure 12:
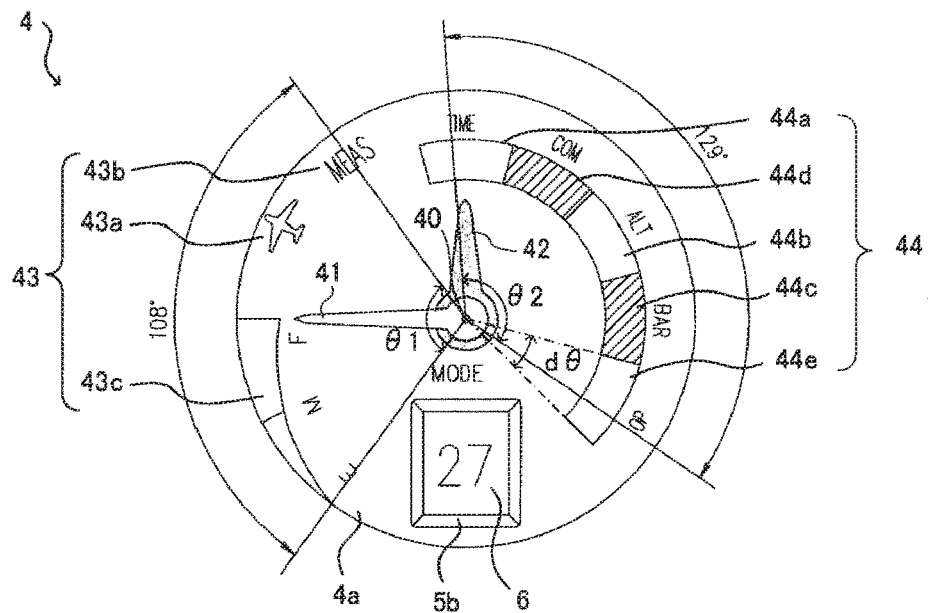
FIG. 12 is a plan view illustrating still another modification example of the 6 o'clock information display unit.

In the foregoing embodiment, the "ALT" region 44b, the "BAR" region 44c, and the "COM" region 44d may be disposed in a line in the sequence of the "COM" region 44d, the "ALT" region 44b, and the "BAR" region 44c, for example, as illustrated in FIG. 12.

At this time, in the rotation direction (the revolving direction) of the first display hand 42, a distance between the "COM" region 44d and the "ALT" region 44b is shorter than a distance between the "BAR" region 44c and the "COM" region 44d. Further, a distance between the "ALT" region 44b and the "BAR" region 44c is shorter than a distance between the "BAR" region 44c and the "COM" region 44d. Here, the distance between the "BAR" region 44c and the "COM" region 44d in the rotation direction (revolving direction) of the first display hand 42 means a distance between the "BAR" region 44c and the "COM" region 44d in the rotation direction (the revolving direction) of the first display hand 42 without passing through the "ALT" region 44b.

Then, the control device 100 controls the step motor 51 such that the first display hand 42 points the "COM" region 44d in a case in which the display mode is the azimuth display mode, the first display hand 42 points the "ALT" region 44b in a case in which the display mode is the altitude display mode, and the first display hand 42 points the "BAR" region 44c in a case in which the display mode is the barometric display mode.

Even in this case, the "COM" region 44d, the "ALT" region 44b, and the "BAR" region 44c are disposed together in the rotation direction of the first display hand 42. Therefore, the user can recognize whether the display mode pointed by the first display hand 42 is the altitude display mode, the barometric display mode, or the azimuth display mode.

In Modification Example A, the "COM" region 44d corresponds to the first region, the "ALT" region 44b corresponds to the second region, and the "BAR" region 44c corresponds to the third region.

Figure 13:
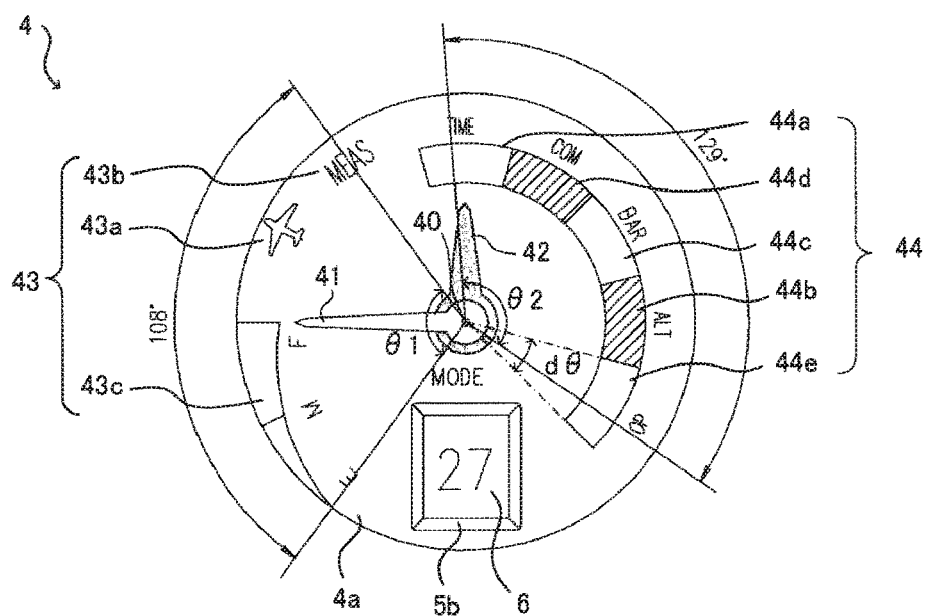
FIG. 13 is a plan view illustrating still another modification example of the 6 o'clock information display unit.

Modification Example B of Arrangement Sequence of "ALT" Region 44b, "BAR" Region 44c, and "COM" Region 44d In the foregoing embodiment, the "ALT" region 44b, the "BAR" region 44c, and the "COM" region 44d may be disposed in a line in the sequence of the "COM" region 44d, the "BAR" region 44c, and the "ALT" region 44b, for example, as illustrated in FIG. 13.

At this time, in the rotation direction (the revolving direction) of the first display hand 42, a distance between the "COM" region 44d and the "BAR" region 44c is shorter than a distance between the "ALT" region 44b and the "COM" region 44d. Further, a distance between the "BAR" region 44c and the "ALT" region 44b is shorter than a distance between the "ALT" region 44b and the "COM" region 44d. Here, the distance between the "ALT" region 44b and the "COM" region 44d in the rotation direction (revolving direction) of the first display hand 42 means a distance between the "ALT" region 44b and the "COM" region 44d in the rotation direction (the revolving direction) of the first display hand 42 without passing through the "BAR" region 44c.

Then, the control device 100 controls the step motor 51 such that the first display hand 42 points the "COM" region 44d in a case in which the display mode is the azimuth display mode, the first display hand 42 points the "BAR" region 44c in a case in which the display mode is the barometric display mode, and the first display hand 42 points the "ALT" region 44b in a case in which the display mode is the altitude display mode.

Even in this case, the "COM" region 44d, the "ALT" region 44b, and the "BAR" region 44c are disposed together in the rotation direction of the first display hand 42. Therefore, the user can recognize whether the display mode pointed by the first display hand 42 is the altitude display mode, the barometric display mode, or the azimuth display mode.

In Modification Example B, the "COM" region 44d corresponds to the first region, the "BAR" region 44c corresponds to the second region, and the "ALT" region 44b corresponds to the third region.

Figure 14:
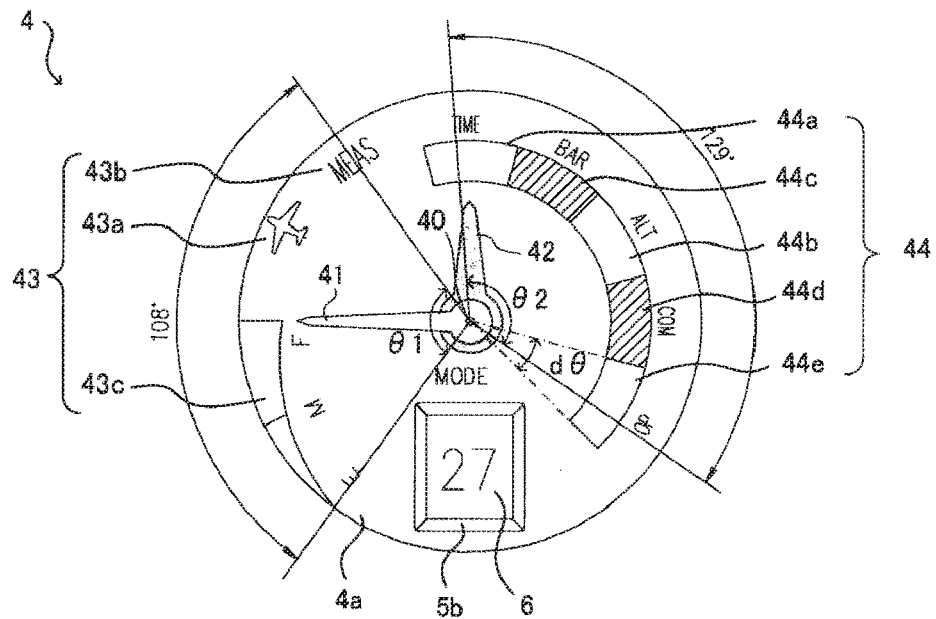
FIG. 14 is a plan view illustrating still another modification example of the 6 o'clock information display unit.

Modification Example C of Arrangement Sequence of "ALT" Region 44b, "BAR" Region 44c, and "COM" Region 44d In the foregoing embodiment, the "ALT" region 44b, the "BAR" region 44c, and the "COM" region 44d may be disposed in a line in the sequence of the "BAR" region 44c, the "ALT" region 44b, and the "COM" region 44d, for example, as illustrated in FIG. 14.

At this time, in the rotation direction (the revolving direction) of the first display hand 42, a distance between the "BAR" region 44c and the "ALT" region 44b is shorter than a distance between the "COM" region 44d and the "BAR" region 44c. Further, a distance between the "ALT" region 44b and the "COM" region 44d is shorter than a distance between the "COM" region 44d and the "BAR" region 44c. Here, the distance between the "COM" region 44d and the "BAR" region 44c in the rotation direction (revolving direction) of the first display hand 42 means a distance between the "COM" region 44d and the "BAR" region 44c in the rotation direction (the revolving direction) of the first display hand 42 without passing through the "ALT" region 44b.

Then, the control device 100 controls the step motor 51 such that the first display hand 42 points the "BAR" region 44c in a case in which the display mode is the barometric display mode, the first display hand 42 points the "ALT" region 44b in a case in which the display mode is the altitude display mode, and the first display hand 42 points the "COM" region 44d in a case in which the display mode is the azimuth display mode.

Even in this case, the "COM" region 44d, the "ALT" region 44b, and the "BAR" region 44c are disposed together in the rotation direction of the first display hand 42. Therefore, the user can recognize whether the display mode pointed by the first display hand 42 is the altitude display mode, the barometric display mode, or the azimuth display mode.

In Modification Example C, the "BAR" region 44c corresponds to the first region, the "ALT" region 44b corresponds to the second region, and the "COM" region 44d corresponds to the third region.

Figure 15:
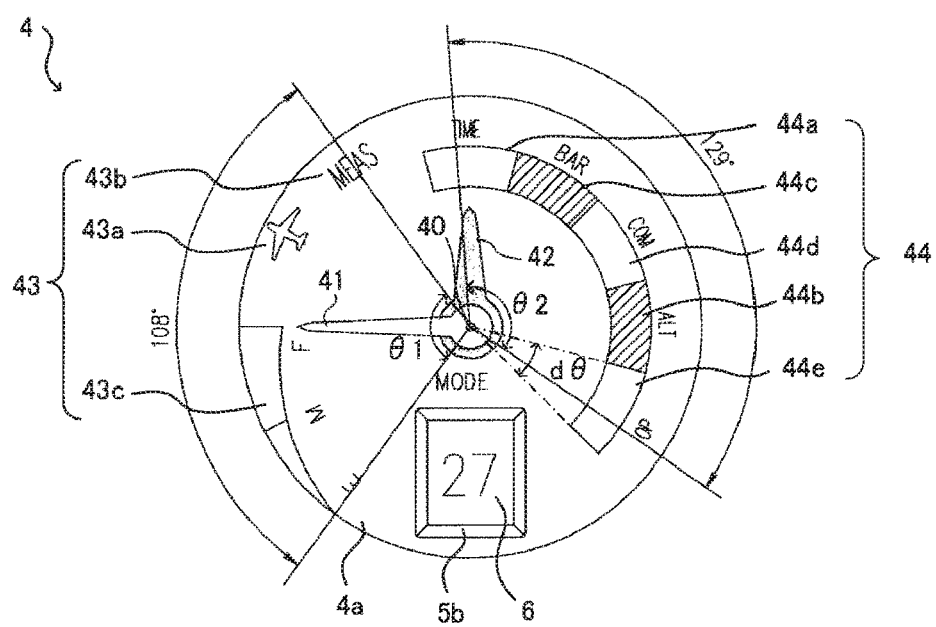
FIG. 15 is a plan view illustrating still another modification example of the 6 o'clock information display unit.

Modification Example D of Arrangement Sequence of "ALT" Region 44b, "BAR" Region 44c, and "COM" Region 44d In the foregoing embodiment, the "ALT" region 44b, the "BAR" region 44c, and the "COM" region 44d may be disposed in a line in the sequence of the "BAR" region 44c, the "COM" region 44d, and the "ALT" region 44b, for example, as illustrated in FIG. 15.

At this time, in the rotation direction (the revolving direction) of the first display hand 42, a distance between the "BAR" region 44c and the "COM" region 44d is shorter than a distance between the "ALT" region 44b and the "BAR" region 44c. Further, a distance between the "COM" region 44d and the "ALT" region 44b is shorter than a distance between the "ALT" region 44b and the "BAR" region 44c. Here, the distance between the "ALT" region 44b and the "BAR" region 44c in the rotation direction (revolving direction) of the first display hand 42 means a distance between the "ALT" region 44b and the "BAR" region 44c in the rotation direction (the revolving direction) of the first display hand 42 without passing through the "COM" region 44d.

Then, the control device 100 controls the step motor 51 such that the first display hand 42 points the "BAR" region 44c in a case in which the display mode is the barometric display mode, the first display hand 42 points the "COM" region 44d in a case in which the display mode is the azimuth display mode, and the first display hand 42 points the "ALT" region 44b in a case in which the display mode is the altitude display mode.

Even in this case, the "COM" region 44d, the "ALT" region 44b, and the "BAR" region 44c are disposed together in the rotation direction of the first display hand 42. Therefore, the user can recognize whether the display mode pointed by the first display hand 42 is the altitude display mode, the barometric display mode, or the azimuth display mode.

In Modification Example D, the "BAR" region 44c corresponds to the first region, the "COM" region 44d corresponds to the second region, and the "ALT" region 44b corresponds to the third region.

Modification Example of 6 O'Clock Information Display Unit 4

Figure 16:
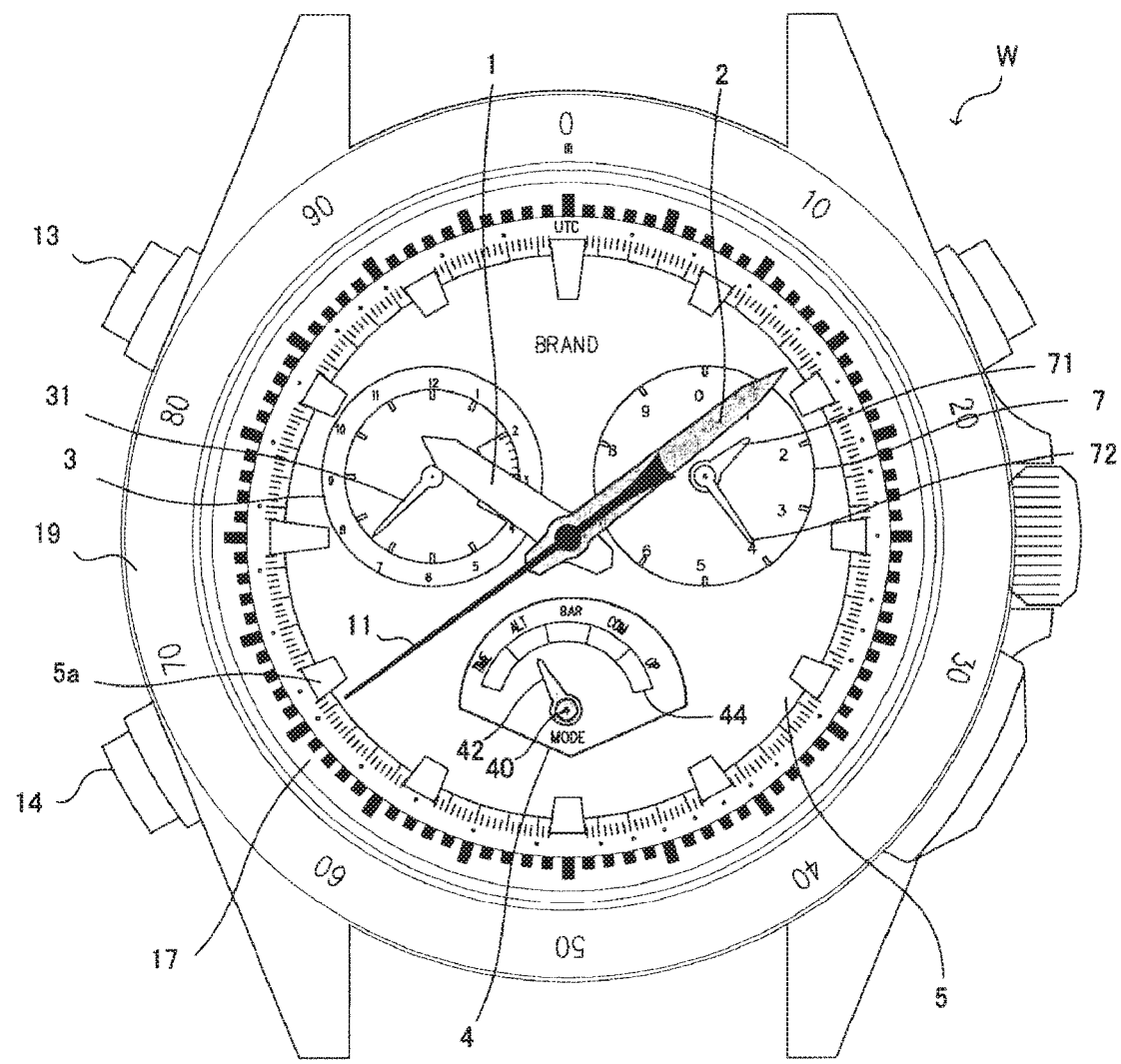
FIG. 16 is a plan view illustrating still another modification example of the 6 o'clock information display unit.

The shape of the 6 o'clock information display unit 4 may be a fan shape, for example, as illustrated in FIG. 16. In the 6 o'clock information display unit 4 illustrated in FIG. 16, the second display hand 41, the second display region 43, and the information display unit 5b, and the date wheel 6 are not illustrated.

In the above-described embodiment and modification examples, a primary battery has been exemplified as the power supply of the driving source such as the step motor 51. However, the invention is not limited thereto and any power supply may be used. For example, a secondary battery may be used as the power supply. In this case, the secondary battery may be charged with an external commercial power supply of 100 V. Further, a solar battery panel is contained in the electronic timepiece W and the secondary battery may be charged with power generated by the solar battery panel.

In the foregoing embodiment, the altitude sensor 101 and the barometric sensor 103 have been installed. However, in a case in which a table indicating a relation between a barometric pressure and an altitude is stored in a storage device (not illustrated) and the control device 100 has a function of reading an altitude according to a barometric pressure from the table, the barometric sensor (pressure sensor) 103 can also serve as the altitude sensor 101. The control device 100 may decide an altitude by calculating geographic information (positional information) through positioning calculation by GPS and may display the decided altitude. In this case, the altitude sensor 101 can be omitted.

The entire disclosure of Japanese Patent Application No. 2016-063674, filed Mar. 28, 2016 is expressly incorporated by reference herein.

What is claimed is:

1. An electronic timepiece that has an altitude display mode in which an altitude is displayed, a barometric display mode in which a barometric pressure is displayed, and an azimuth display mode in which an azimuth is displayed, as display modes, the electronic timepiece comprising:
   an information display unit that includes first, second, and third regions; and
   a first display hand that displays the altitude display mode by pointing the first region, displays the barometric display mode by pointing the second region, and displays the azimuth display mode by pointing the third region,
   wherein the first, second and third regions of the information display unit are arranged such that the second region is disposed between the first and third regions.

2. The electronic timepiece according to claim 1, further comprising:
   a second display hand that displays an operation state of the electronic timepiece by pointing a fourth region and displays a residual quantity of a battery which is a power supply of the electronic timepiece by pointing a fifth region,
   wherein a predetermined region including the first, second, and third regions is adjacent to a specific region including the fourth and fifth regions.

3. The electronic timepiece according to claim 2, wherein the first and second display hands rotate about a same axis.

4. The electronic timepiece according to claim 2, wherein the operation state which is displayed by the second display hand includes a measurement progress state meaning that measurement corresponding to a display mode which is displayed by the first display hand is being executed, wherein in the fourth region, a sixth region corresponding to the measurement progress state is adjacent to the predetermined region.

5. The electronic timepiece according to claim 2, wherein the second display hand operates at intervals of angles obtained by dividing 360° by 4n (where n is a natural number less than 15).

6. The electronic timepiece according to claim 1, wherein in a rotation direction of the first display hand, a distance between the first and second regions and a distance between the second and third regions are shorter than a distance between the third and first regions.

7. The electronic timepiece according to claim 1, further comprising:
   a driving unit that rotates the first display hand; and
   a control unit that controls the driving unit such that the first display hand points the first region in a case in which the display mode is the altitude display mode, the first display hand points the second region in a case in which the display mode is the barometric display mode, and the first display hand points the third region in a case in which the display mode is the azimuth display mode.

8. An electronic timepiece that has an azimuth display mode in which an azimuth is displayed, an altitude display mode in which an altitude is displayed, and a barometric display mode in which a barometric pressure is displayed, as display modes, the electronic timepiece comprising:
   an information display unit that includes first, second, and third regions; and
   a first display hand that displays the azimuth display mode by pointing the first region, displays the altitude display mode by pointing the second region, and displays the barometric display mode by pointing the third region,
   wherein the first, second and third regions of the information display unit are arranged such that the second region is disposed between the first and third regions.

9. The electronic timepiece according to claim 8, wherein in a rotation direction of the first display hand, a distance between the first and second regions and a distance between the second and third regions are shorter than a distance between the third and first regions.

10. The electronic timepiece according to claim 8, further comprising:
    a driving unit that rotates the first display hand; and a control unit that controls the driving unit such that the first display hand points the first region in a case in which the display mode is the azimuth display mode, the first display hand points the second region in a case in which the display mode is the altitude display mode, and the first display hand points the third region in a case in which the display mode is the barometric display mode.

11. An electronic timepiece that has an azimuth display mode in which an azimuth is displayed, a barometric display mode in which a barometric pressure is displayed, and an altitude display mode in which an altitude is displayed, as display modes, the electronic timepiece comprising:
an information display unit that includes first, second, and third regions; and
a first display hand that displays the azimuth display mode by pointing the first region, displays the barometric display mode by pointing the second region, and displays the altitude display mode by pointing the third region,
wherein the first, second and third regions of the information display unit are arranged such that the second region is disposed between the first and third regions.

12. The electronic timepiece according to claim 11, wherein in a rotation direction of the first display hand, a distance between the first and second regions and a distance between the second and third regions are shorter than a distance between the third and first regions.

13. The electronic timepiece according to claim 11, further comprising:
a driving unit that rotates the first display hand; and
a control unit that controls the driving unit such that the first display hand points the first region in a case in which the display mode is the azimuth display mode, the first display hand points the second region in a case in which the display mode is the barometric display mode, and the first display hand points the third region in a case in which the display mode is the altitude display mode.

14. An electronic timepiece that has a barometric display mode in which a barometric pressure is displayed, an altitude display mode in which an altitude is displayed, and an azimuth display mode in which an azimuth is displayed, as display modes, the electronic timepiece comprising:
an information display unit that includes first, second, and third regions; and
a first display hand that displays the barometric display mode by pointing the first region, displays the altitude display mode by pointing the second region, and displays the azimuth display mode by pointing the third region,
wherein the first, second and third regions of the information display unit are arranged such that the second region is disposed between the first and third regions.

15. The electronic timepiece according to claim 14, wherein in a rotation direction of the first display hand, a distance between the first and second regions and a distance between the second and third regions are shorter than a distance between the third and first regions.

16. The electronic timepiece according to claim 14, further comprising:
a driving unit that rotates the first display hand; and
a control unit that controls the driving unit such that the first display hand points the first region in a case in which the display mode is the barometric display mode, the first display hand points the second region in a case in which the display mode is the altitude display mode, and the first display hand points the third region in a case in which the display mode is the azimuth display mode.

17. An electronic timepiece that has a barometric display mode in which a barometric pressure is displayed, an azimuth display mode in which an azimuth is displayed, and an altitude display mode in which an altitude is displayed, as display modes, the electronic timepiece comprising:
an information display unit that includes first, second, and third regions; and
a first display hand that displays the barometric display mode by pointing the first region, displays the azimuth display mode by pointing the second region, and displays the altitude display mode by pointing the third region,
wherein the first, second and third regions of the information display unit are arranged such that the second region is disposed between the first and third regions.

18. The electronic timepiece according to claim 17, wherein in a rotation direction of the first display hand, a distance between the first and second regions and a distance between the second and third regions are shorter than a distance between the third and first regions.

19. The electronic timepiece according to claim 17, further comprising:
a driving unit that rotates the first display hand; and
a control unit that controls the driving unit such that the first display hand points the first region in a case in which the display mode is the barometric display mode, the first display hand points the second region in a case in which the display mode is the azimuth display mode, and the first display hand points the third region in a case in which the display mode is the altitude display mode.

* * * * *